March 20, 1956 E. J. BERNET 2,739,239
IMPERFECTION COUNTER
Filed March 5, 1953

INVENTOR
Edwin J. Bernet
BY
Pennie, Edmonds, Morton, Barrows & Taylor
ATTORNEYS

United States Patent Office 2,739,239

Patented Mar. 20, 1956

2,739,239

IMPERFECTION COUNTER

Edwin J. Bernet, Charlottesville, Va., assignor to Institute of Textile Technology, Charlottesville, Va., a corporation of Virginia Application March 5, 1953, Serial No. 340,567

5 Claims. (Cl. 250—27)

Figures 1, 1A:
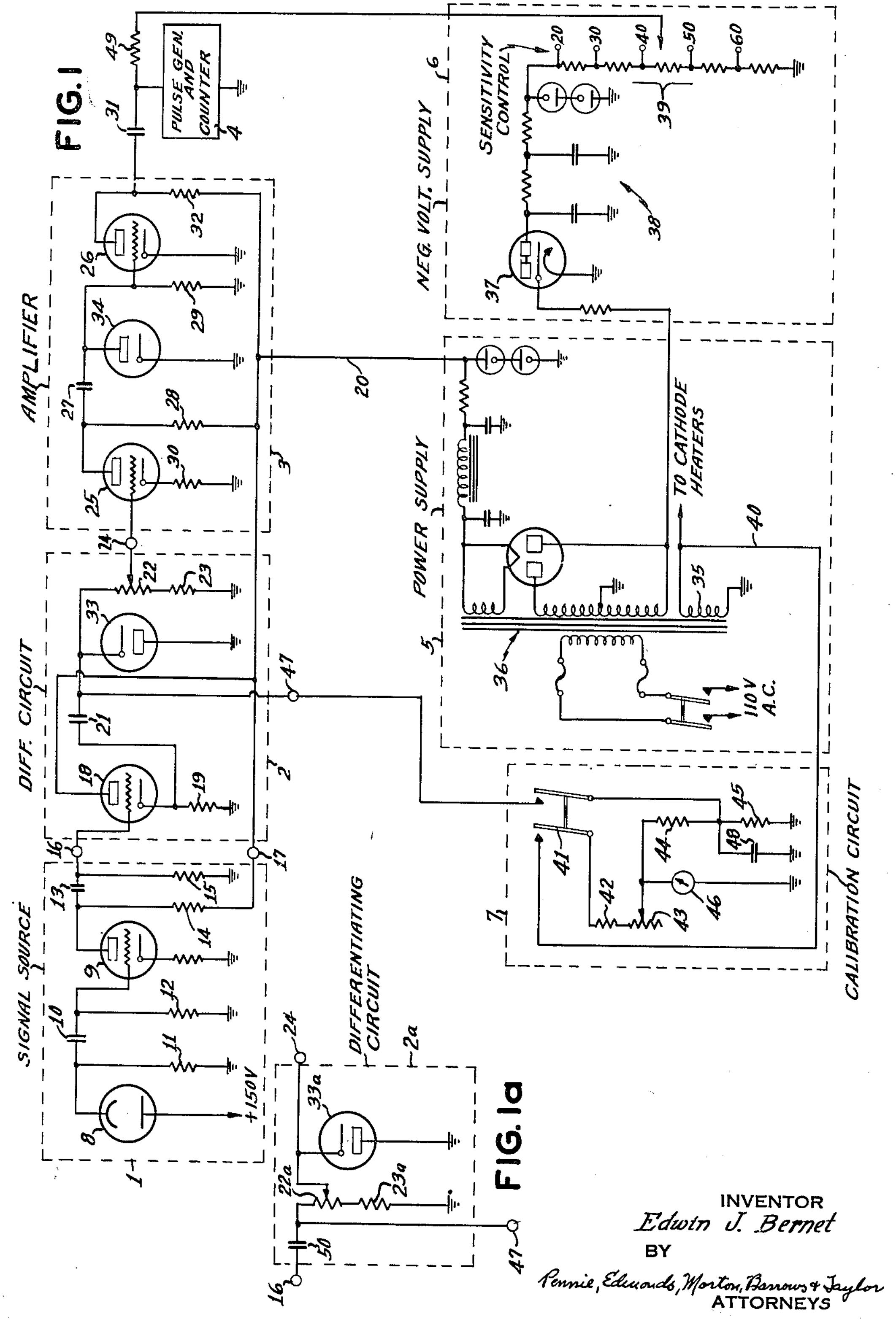

This invention relates to the grading of yarns and the like and is concerned especially with the detection and counting of neps and other short imperfections.

In connection with the grading of yarns and similar products, especially cotton yarns, the factors of uniformity or evenness and of small imperfections such as neps are of paramount importance. Since these irregularities can be controlled by processing operations, it is important to detect them promptly in order to make the necessary corrections.

The uniformity meter which is the subject of U. S. Patent 2,576,772, granted November 26, 1951, detects and measures with considerable accuracy the variations in evenness of yarns and the like which are inherently fairly long, say several inches, but does not detect short variations such as neps, which are of the order of a fraction of an inch in length and thus are of a different order of magnitude.

The imperfection counter in accordance with the present invention detects and counts the short imperfections such as neps which are not detected by the mentioned uniformity meter, although the imperfection counter is adapted to operate in conjunction with the uniformity meter in the manner below described.

Briefly, the present invention comprises in combination a device or system which detects the imperfections and transforms them into electrical signals, a differentiating circuit which passes only components of the signals which represent the particular imperfections to be counted, a rectifying circuit which clips or removes from the differentiated signals spurious or duplicated signals introduced in the differentiating circuit, a suitable amplifier, and a counter which counts and registers the waves or pulses representing the selected imperfections.

The invention and its many advantages will be better understood from the following description considered in connection with the accompanying drawing, wherein:

Fig. 1 is a circuit diagram of a preferred embodiment of apparatus in accordance with the present invention; and Fig. 1*a* is a circuit diagram of an alternative differentiating circuit adapted to be substituted for the differentiating circuit shown in Fig. 1.

Referring to Fig. 1, the signal source 1 is represented to comprise a photo-cell and amplifier system which detects the imperfections and transforms them into varying electrical signals. The mentioned differentiating circuit is included in box 2 together with an amplifier of the cathode-follower type and a clipping diode, followed by an amplifier 3 comprising two amplifier stages and an intervening clipper diode. To the output of the second amplifier stage is coupled a counter 4 which preferably includes a pulse generator for forming the output signals from the amplifier into pulses. In addition, the apparatus of Fig. 1 includes a suitable power supply 5, a negative voltage supply 6 for use in adjusting the sensitivity of the counter and thus the minimum size of imperfections which are counted, and a calibration circuit 7 from which a signal of preselected standard voltage is derived. The gain of the amplifier is adjusted to this input voltage to provide the desired standardized response of the counter.

Referring now in more detail to the components illustrated in the circuit diagram of Fig. 1, the photoelectric tube 8 (RCA type 929 being suitable) is coupled to a triode amplifier tube 9 through coupling condenser 10 and resistors 11 and 12. Tube 9 may conveniently comprise half of a type 12AT7 tube. The output of amplifier 9 is coupled through condenser 13 and resistors 14 and 15, through intervening terminals 16, 17 to the input of cathode follower tube 18, which is included in the differentiating circuit 2. Tube 18 is conveniently the second half of the type 12AT7 tube of which amplifier 9 is the first half. The cathode follower includes resistors 19 and 20 connected in the usual manner. Condenser 21 and resistors 22 and 23 in series, are connected in shunt to cathode follower resistor 19. Hence output signal voltage from the cathode follower appears at terminal 24 connected to the slider of resistor 22 which in this case takes the form of a potentiometer and constitutes means for calibrating the apparatus in the manner later to be described.

Condenser 21 and resistors 22, 23 connected in shunt across cathode follower resistor 19 constitute a differentiating circuit, and, in the specific example here illustrated and described, are of magnitudes providing a time constant of approximately 200 microseconds. The values of various of the circuit elements, and especially those forming the differentiation elements, must of course be selected to conform to the frequencies involved. These depend not only on the size and shape of the neps and nep-like imperfections but also on the linear speed of the yarn being measured. The values of the coupling elements between amplifier stages are determined in accordance with the assumed or anticipated spacing between neps.

When such a differentiating circuit is connected to an amplifier as illustrated in box 3, the output of the amplifier will comprise not only the original wave or pulse signal which was differentiated, but also a mirror image thereof which is commonly referred to as a "return trace." When, as in the present instance, the signals are intended to be counted, such return traces are essentially spurious signals because, after phase reversal by the amplifier, they double the number of waves or pulses counted. Hence, in accordance with the invention the diode rectifier 33 is shunted across resistors 22, 23 in such polarity as to clip or remove the added half waves or pulses in order to prevent the mentioned doubling of the pulses counted. Assuming that the signal voltage developed across resistors 22, 23 is to be essentially positive, the diode 33 will clip the negative voltage waves. The type 6AL5 rectifier tube is suitable for the present purpose, especially because it is a double diode; and if the anodes and cathodes are respectively tied together, the resulting low impedance is an advantage.

Amplifier 3 includes, as above mentioned, a first stage comprising triode 25 and a second stage comprising triode 26. These triodes may comprise, respectively, the two halves of another type 12AT7 tube. They are coupled together by condenser 27 and resistors 28, 29. To increase the stability, triode 25 includes in its cathode circuit a resistor 30 which introduces degeneration. The output of second-stage amplifier triode 26 is coupled to counter 4 by means of coupling condenser 31 and resistor 32.

For the reasons above mentioned in connection with the differentiating circuit, coupling elements 27, 28 and 29 also have a differentiating effect with respect to the signals passed from the output of amplifier stage 25 to the input of amplifier stage 26. Therefore, and because it is desirable to concentrate the differentiation in one point in the system, diode rectifier 34 is connected in shunt to resistor 29 in order to clip the return trace waves from the signal waves impressed upon the second amplifier stage 26. It will be noted that the polarity of rectifier 34 is reversed with respect to that of rectifier 33 because of the phase reversal introduced by intervening triode 25. Thus both rectifiers are connected with polarity to discriminate against return trace signals formed by differentiating coupling elements which immediately precede an amplifier stage.

The counter 4 may comprise any device suitable for the purpose. One such counter is the electronic counter model 10 of Berkeley Scientific Corporation, Richmond, California. This counter is adapted to count pulses regardless of shape because it comprises an input amplifier, a pulse shaper, a decimal counting unit, and a registering circuit, as well as a power supply. The pulse shaper is essentially a flip-flop circuit which produces an output pulse with any rise of positive input of more than a certain threshold voltage, such as 2 volts, even though this rise be very slow, for example, several seconds. Additionally, the Berkeley counter has the advantage (which is important in the present case) of having a very rapid response of but a few microseconds. This improves the accuracy of the count because occasionally the neps which are to be counted occur very close together so that at the speed at which the yarn travels through the measuring head (here assumed to be 5 feet per second), the neps may occur approximately $\frac{1}{1000}$ second apart.

The power supply 5 which furnishes to the thermionic tubes shown in the diagram the customary high-potential direct current for the anode or plate supply, is of usual voltage-regulated type and requires no explanation. The customary low-voltage winding 35 of the power transformer 36 is, as indicated, provided to furnish heating current to the cathode heaters of the various tubes represented in the diagram. However, the cathode heaters and the connections thereto have been omitted to simplify the diagram.

The negative voltage supply 6 derives its input current from the transformer 36 and, by means of rectifier tube 37 and filter 38 this current is rectified and filtered. The filtered current flowing through voltage divider 39 provides a variable source of negative voltage between the various taps or contact points on the voltage divider and ground. This voltage divider may be of approximately 30,000 ohms. In the alternative, a continuously variable potentiometer having a resistance of, say, 30,000 ohms connected in series at the bottom with a fixed resistor of approximately 1,000 ohms, can be employed. In either case it is desirable to mark the taps on the voltage divider, or the corresponding positions on the potentiometer, with numbers representing the "count" of the range of yarn likely to be measured. For example, the taps or contacts illustrated on voltage divider 39 might be marked 20, 30, 40, 50 and 60 cotton count. This provision for the adjustment of the sensitivity is important for the following reasons: If the counter were adjusted for its maximum sensitivity it would count all neps or other short imperfections large enough to produce a signal voltage sufficient to operate the counter, viz., one of approximately 2 volts. This would be true regardless of the size or count of the yarn. As a result, the yarns of larger sizes might, and probably would, be indicated as having an excessive number of neps and thus be recorded as imperfect, whereas as a practical matter the smaller neps are not objectionable on yarns of the larger sizes because it is the ratio of the two which determines whether such imperfections are or are not noticeable. Consequently the industry has established standards which are based on imperfections observable to the average eye, and it is these standards to which the sensitivity control should be adjusted. In other words, for a large yarn the sensitivity control bias voltage might be set at 50 volts and then the threshold of the counter would be between 50 and 52 volts rather than between 0 and 2 volts for the finest yarns when no negative bias is impressed on the counter.

From the foregoing it will be evident that the amount of gain in the amplifier determines in part the magnitude of the signals and, therefore, the number of pulses counted. In other words, the calibration of the imperfection counter of this invention is dependent upon the exact gain of the amplifier 3. It would, therefore, be desirable to employ an amplifier having carefully stabilized gain. However, in order to simplify the apparatus and to reduce the cost, amplifier stages of the more usual type are here shown in combination with novel means for calibrating the amplifier in order to check and standardize the gain as required. By means of the calibration circuit herein disclosed, this step can be rapidly made, and in practice has been found to be necessary only at the beginning of each day's operation.

Referring to Fig. 1, the mentioned calibration circuit is shown within box 7. A connection 40 from the cathode heater winding 35 provides a source of low A. C. voltage, for example, 6.3 volts. By closing switch 41 this voltage at 60 cycles is impressed across resistors 42, 43, 44 and 45, of which resistor 43 is variable. A voltmeter 46 having a range of 0 to 5 volts A. C. is connected between the slider of the resistor 43 and ground. Resistors 44 and 45 constitute a voltage divider in respect to the adjusted voltage measured by the voltmeter. Hence a suitable fraction of the measured voltage is impressed across resistors 22, 23 which control the gain and thus the calibration of the amplifier. In connection with the particular embodiment herein illustrated, a calibrating voltage of 0.4 volt at 60 cycles applied at terminal 47 has been found to be satisfactory as a standard for calibration. Having applied this standard voltage to terminal 47, and with no input signal at terminal 16, the apparatus is calibrated by adjusting potentiometer 22 until counter 4 just begins to count 60 pulses per second. Under these conditions the gain of amplifier 3 has been so adjusted that an input of 0.4 volt has been amplified to 152 volts which corresponds to 150 volts bias from the sensitivity control 39 plus the 2-volt threshold of the counter.

The manner in which the imperfections in the yarn produce electric signals is important in connection with the present invention. If the imperfections are to be detected by a photo-electric cell such as phototube 8 of Fig. 1, the measuring head through which the yarn passes would include in well-known manner a light source and a slitted screen in front of it to restrict the light beam to a width of the order of the diameter of the yarn to be measured. The phototube 8 is placed on the opposite side of the yarn from the light source so that as the yarn passes across the slit a light beam of varying outline and hence of varying intensity will be intercepted by the phototube. The electric output of the phototube circuit will then constitute an electric signal of correspondingly varying electric voltage.

Certain alternative forms of detecting or pickup devices are equally useful in combination with the present invention. For example, and as first above mentioned, the signal source may comprise the uniformity meter described in U. S. Patent 2,576,772 as employed with its measuring head of electrostatic type. To accomplish this is would be necessary merely to disconnect the signal source 1 at terminals 16, 17 of the diagram herein and to connect terminal 16 with its connection to the grid of cathode follower tube 18, to the jack 181 of Fig. 1 of the mentioned patent. It may be advantageous, also, to disconnect the direct-current amplifier below jack 181 of the patent drawing. At the same time it would be advisable to disconnect the measuring or meter circuit to the right of jack 181 of Fig. 1 of the patent, including resistor 68, and to decrease the capacity of condenser 65 to a value of approximately 0.0001 microfarad.

The measuring or pickup head 34 as employed with the uniformity meter of the mentioned patent in the measurement of yarns and the like has customarily been provided with fixed condenser plates approximately ½" long, as measured in the direction of travel of the yarn. Since such plates are considerably longer than the neps to be detected and counted by the apparatus of the present invention, a measuring head of those proportions would not be satisfactory. It has been found that plates approximately 1/16" long may be satisfactorily employed. This conforms with the rule applicant discovered that the length of condenser plates of the measuring head should not be appreciably greater than the irregularities to be measured. In view of the fact that neps vary in size from approximately 1/32" to slightly more than 1/16" in length, the mentioned length of plates is appropriate. For cotton yarns of 10 to 40 count the plates should be spaced approximately 0.02 inch and for 30 to 100 count they should be spaced approximately 0.014 inch apart.

In employing the uniformity meter as an alternative to the photo-electric signal source as above described, the differentiating circuit 2 including cathode follower 18 can be employed. However, it has ben found that with some models of uniformity meters the cathode follower is unnecessary, and that a more simple form of differentiating circuit can be substituted for that illustrated in box 2 of Fig. 1. Such simpler form is illustrated in Fig. 1*a* within box 2*a*. In this embodiment circuit elements corresponding to those represented in Fig. 1 have been designated by the same reference characters with the letter "*a*" annexed. This differentiating circuit is the same in its function as that of Fig. 1, its operation and use being also the same, and therefore requires no additional description.

If undesired intertube coupling results from use of a common "B" voltage supply, this can be eliminated by adding well-known decoupling circuits. For example, a 100,000 ohm resistor may be connected in series between the power supply lead 20 and the anode of tube 18 and two similar ones between lead 20 and anode resistors 14 and 28, respectively. Then three 10-mfd. condensers are connected between ground and the upper end of each of the added resistors, respectively.

To facilitate the use of the present invention the following constants of circuit elements are suggested as having proved successful in a particular embodiment. They are not intended as a limitation because many variations in the values as well as in the specific nature and interconnections of the elements may be made without departing from the spirit of the invention as defined in the claims.

*Resistors*

| | | |
|---|---|---|
| **15, 29, 49** | megohm | 1 |
| **14, 28, 32** | ohms | 150,000 |
| **23** | do | 70,000 |
| **19** | do | 56,000 |
| **22** | do | 30,000 |
| **44** | do | 10,000 |
| **30** | do | 1,000 |
| **45** | do | 750 |
| **42, 43** | do | 5 |

*Capacitors*

| | | |
|---|---|---|
| **13** | mfd | 0.5 |
| **27, 31, 48** | mfd | 0.1 |
| **21, 50** | mfd | 0.002 |

I claim:

1. Apparatus adapted to count imperfections in material in the form of yarn and the like, said imperfections being of the order of 1/16 inch or less in length as measured along the length of said material, said apparatus including means for developing signals corresponding to the imperfections, said signals being of random time-spacing and wide range of amplitudes and having components representing said imperfections and also components representing longer variations in the material, a differentiating circuit including as elements a coupling condenser and a resistor on which all of said signals and components are impressed, said elements being proportioned to pass substantially only the short components and to reject the longer components, a rectifier connected to receive the differentiated signals and polarized to discriminate against return trace signals formed by the differentiating circuit, an amplifier coupled to the output of said rectifier for increasing the amplitude of said short components, the signals at the output of said amplifier being of substantially positive potential, counting means for automatically counting said short components, and means for impressing said positive amplified signals on said counting means, said counting means including means for forming said amplified signals into pulses and for counting the pulses, means for establishing a signal-voltage threshold at which said counting means becomes operative which includes a source of unidirectional negative potential, means for adjusting the magnitude of said potential, and means for impressing the adjusted negative potential on the input of said counting means.

2. Apparatus according to claim 1 which includes a source of alternating-current calibrating voltage of the order of magnitude of that of the minimum signal voltage to be counted, means for accurately adjusting the calibrating voltage to a preselected standard value, means including switching means for impressing said standard voltage on the input of said amplifier, and gain control means connected to the input of said amplifier for adjusting the gain of said amplifier in the presence of said standard voltage to the minimum at which said counting means responds.

3. Apparatus adapted to count short inperfections in material in the form of yarn and the like, including means for developing signals corresponding to the imperfections, said signals being of random time-spacing and wide range of amplitudes and having components representing said imperfections and also components representing longer variations in the material, a differentiating circuit including as elements a coupling condenser and a resistor on which the signals are impressed, said elements being proportioned to pass substantially only the short components and reject the longer components, a rectifier connected to receive the differentiated signals and polarized to discriminate against return trace signals formed by the differentiating circuit, an amplifier for increasing the amplitude of the short components comprising two stages coupled to the output of said rectifier, coupling elements coupling said stages together, a second rectifier connected between said coupling elements and the input of the second amplifier stage and polarized to discriminate against return trace signals formed by said coupling elements, and counting means for automatically counting said imperfections including means for forming the amplified signals from said amplifier into pulses and means for counting the pulses.

4. Apparatus according to claim 3 wherein said amplified signals are substantially of positive potential, in combination with means for establishing a signal-voltage threshold at which said counting means becomes operative which includes a source of uni-directional negative potential, means for adjusting the magnitude of said potential with respect to ground and means for impressing the adjusted negative potential on the input of said counting means.

5. Apparatus according to claim 4 which includes a source of alternating-current calibrating voltage of the order of magnitude of that of the minimum signal voltage to be counted, means for accurately adjusting the calibrating voltage to a preselected standard value, means including switching means for impressing said standard voltage on the input of the first stage of said amplifier, and gain control means connected to the input of the first stage of said amplifier for adjusting the gain of said amplifier in the presence of said standard voltage to the minimum at which said counting means responds.

References Cited in the file of this patent

UNITED STATES PATENTS

| | | |
|---|---|---|
| 2,230,926 | Bingley | Feb. 4, 1941 |

| | | |
|---|---|---|
| 2,325,927 | Wilbur | Aug. 3, 1943 |
| 2,448,718 | Koulicovitch | Sept. 7, 1948 |
| 2,489,302 | Levy | Nov. 29, 1949 |
| 2,498,635 | Bailey | Feb. 28, 1950 |
| 2,565,486 | Feinstein et al. | Aug. 28, 1951 |
| 2,685,027 | Alvarez | July 27, 1954 |